Feb. 23, 1937.  F. WARNER  2,071,670
FISH CONVEYER
Filed Nov. 4, 1935   3 Sheets-Sheet 1
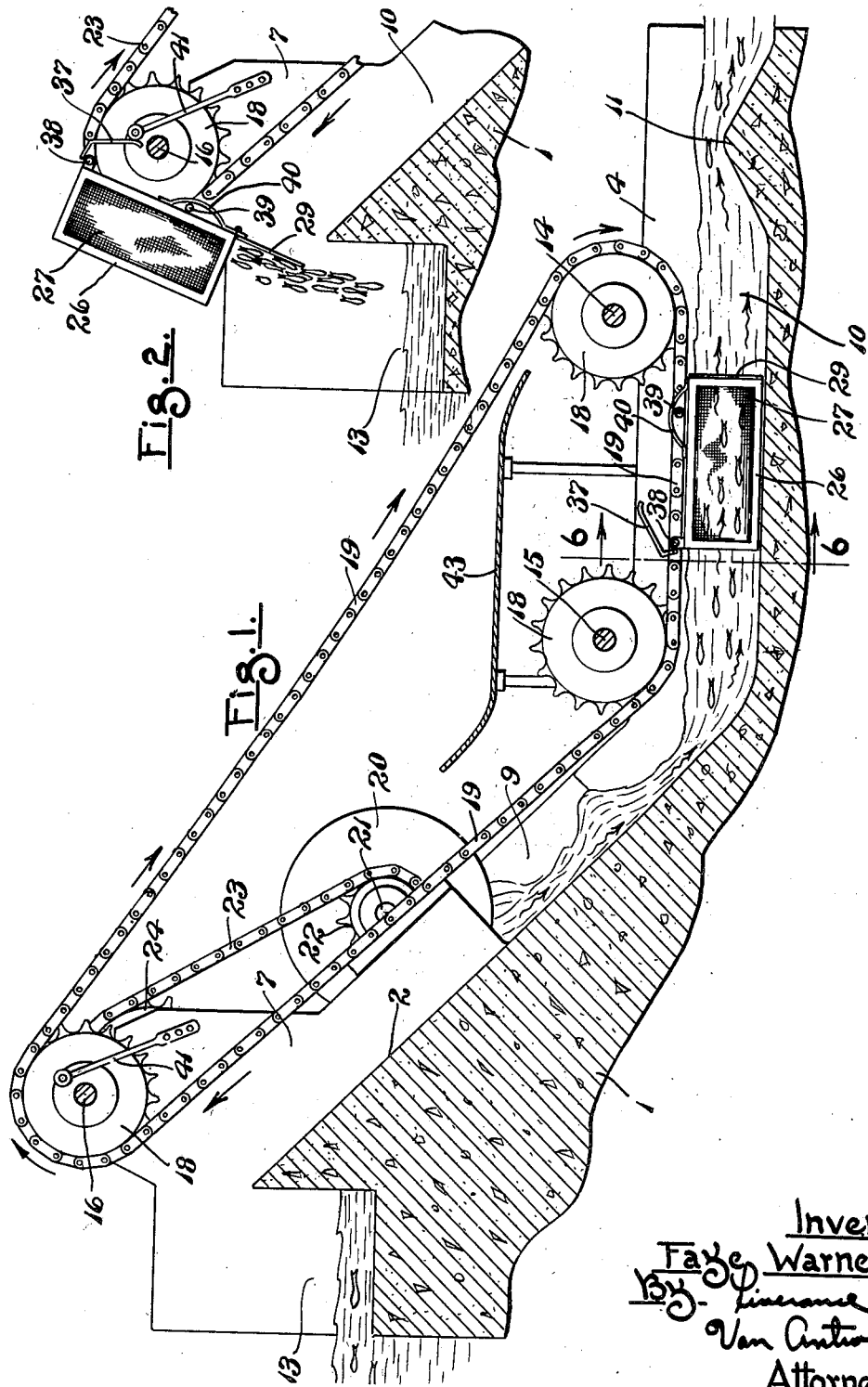
Inventor
Faye Warner

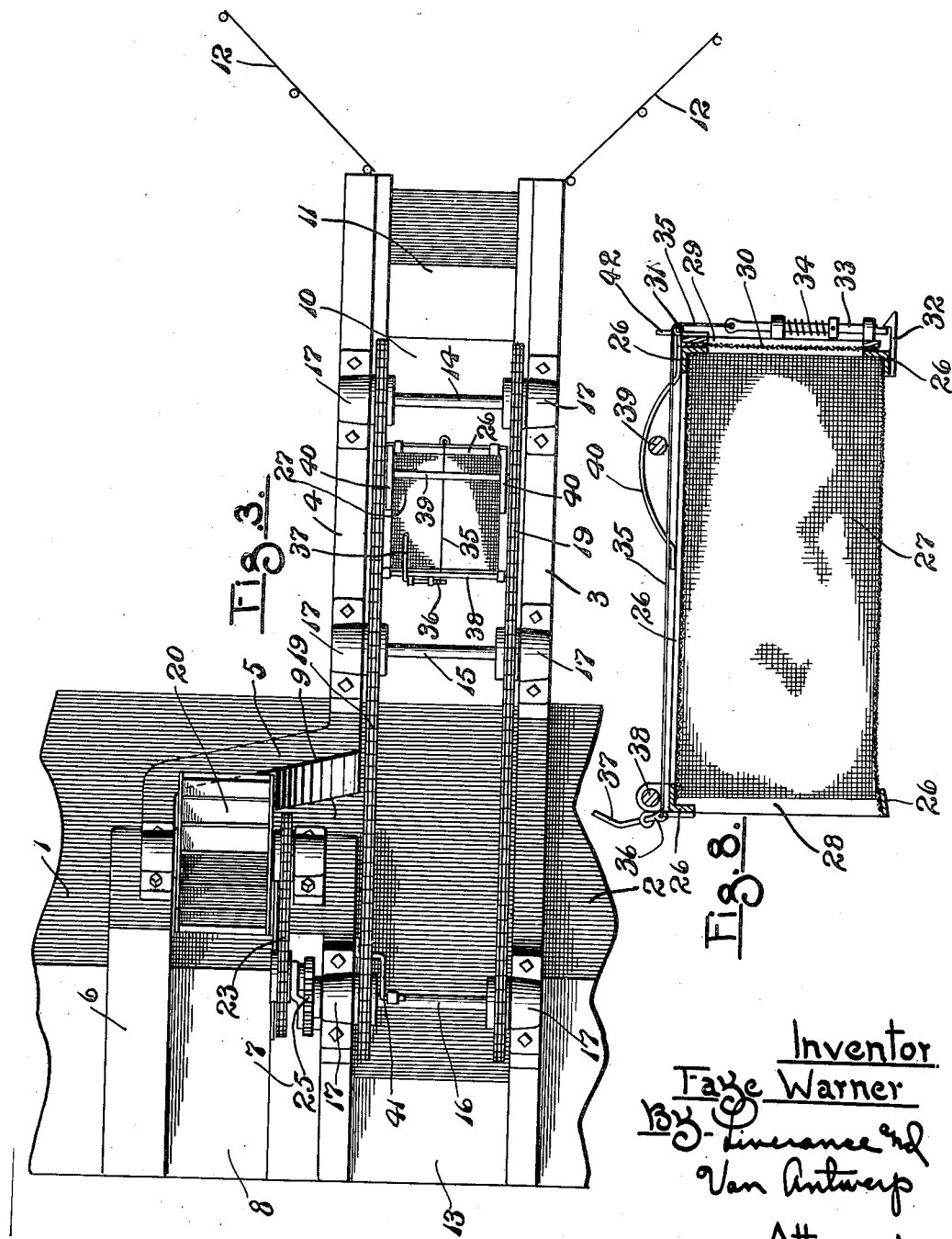

Feb. 23, 1937.  F. WARNER  2,071,670
FISH CONVEYER
Filed Nov. 4, 1935  3 Sheets-Sheet 3
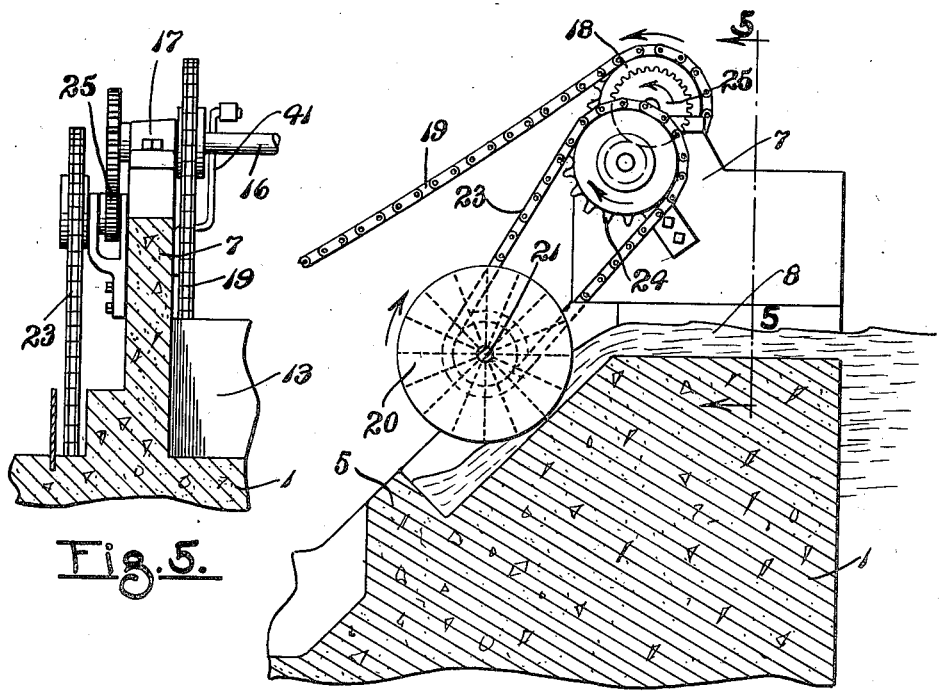
Fig. 5.
Fig. 4.
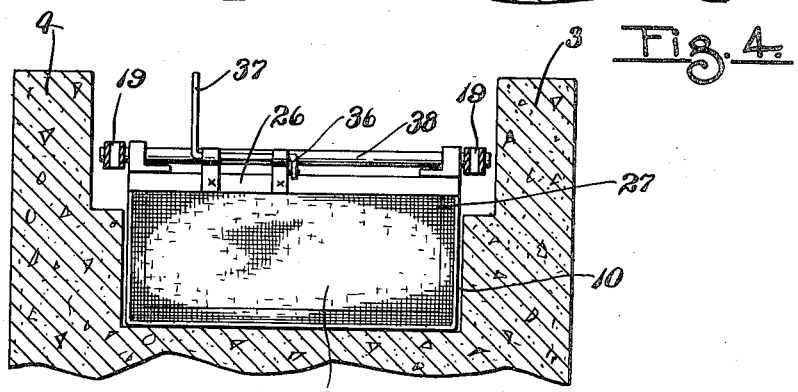
Fig. 6.
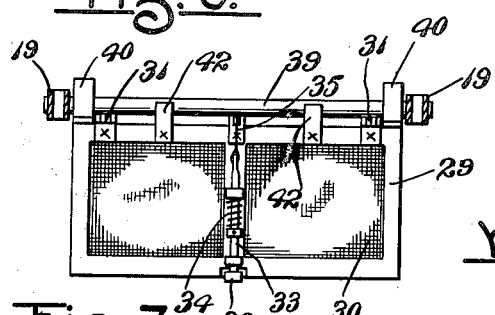
Fig. 7.
Inventor
Faye Warner
By
Van Antwerp
Attorneys Patented Feb. 23, 1937

2,071,670

UNITED STATES PATENT OFFICE 2,071,670

FISH CONVEYER

Faye Warner, St. Joseph, Mich.

Application November 4, 1935, Serial No. 48,081

7 Claims. (Cl. 61—21)

In building dams across streams the passage of fish upwardly in the stream is very seriously interfered with. It is a requirement of State statutes that some means be provided to permit the passage of the fish from below to above the dam, and numerous attempts have been made to satisfactorily accomplish this result. So-called fish ladders are built in dams which generally, in effect, are merely conduits through the dam for the passage of water, the fish being obliged to swim through said water passage or conduit against the force of the water and in an upward direction so as to get from below to above the dam. Such method of fish passage and numerous other methods have not been satisfactory but have been the best that have been devised for the purpose.

With my invention, a very practical and satisfactory means for conveying the fish from below to above the dam is provided. It is a primary object and purpose of the present invention to produce a fish conveyer which may operate continuously during the season or seasons when the fish run and which will scoop the same into a bucket or container, carry them to above the dam and automatically open the bucket when it reaches the desired point in its travel to permit the fish to fall therefrom into the water at the upper side of the dam. A further object of the invention is to provide a means for a continuous stream of water whereby the fish will naturally collect in the stream and in a position such that they will be gathered in by the receptacle or bucket which is mounted on endless conveyer chains. And a still further object of the invention is to provide a structure which can be operated by any convenient source of power. For example, at many dams where electric current is generated there will be an ample supply of electric power for such purpose. In other cases the flowing stream of water referred to, passing over the dam from its upper to its lower side, to provide the current into which the fish naturally enter, serves to operate a water wheel for driving the conveyer.

These and many other objects and purposes will be apparent and readily understood from the following description of the invention, taken in connection with the accompanying drawings, in which, Fig. 1 is a side elevation of the fish conveyer, the dam being shown in transverse vertical section and with the conveyer receptacle or bucket in the position where it receives the fish.

Fig. 2 is a fragmentary section of similar character showing the conveyer receptacle or bucket releasing the fish at the upper side of the dam.

Fig. 3 is a fragmentary plan view of the apparatus applied to the dam.

Fig. 4 is a fragmentary vertical section and side elevation at the upper part and opposite side of the conveying apparatus illustrating a water wheel for driving.

Fig. 5 is a section and elevation, the section being taken on the plane of line 5—5 of Fig. 4.

Fig. 6 is a transverse vertical section substantially on the plane of line 6—6 of Fig. 1.

Fig. 7 is an elevation of the dumping end of the conveyer receptacle or bucket, and Fig. 8 is a longitudinal vertical section through said receptacle or bucket.

Like reference characters refer to like parts in the different figures of the drawings.

The dam 1 is of a conventional character and on the down stream side is inclined downwardly as indicated at 2. With my invention suitable spaced apart longitudinal walls 3 and 4 extend from a distance in front of the dam back to and upwardly along the inclined face of the dam. The wall 3 extends in a substantially straight line to the upper side of the dam. The wall 4 (Fig. 3) extends a short distance up the inclined face of the dam, and is then carried laterally and slightly upward for a distance, as indicated at 5, and then extends in parallelism to the walls 3 and 4 to the upper side of the dam as shown at 6. Between the supporting walls 3 and 6, an intermediate wall 7 is provided substantially in alinement with the wall 4 defining a spill-way 8 between the walls 6 and 7 for water which passes down the same until it reaches the wall 5 where it is directed laterally through the passage 9 between the ends of walls 4 and 7 into the elongated race 10 between the walls 3 and 4. This provides a continuous flow of water and makes a flowing stream into which the fish naturally head during the seasons that they migrate upstream. In practice I prefer to provide an elevation 11 transversely across the race or passage 10, as shown in Fig. 1 so as to provide an elongated pocket between the same and foot of the dam. In addition wings 12 (Fig. 3) diverge from the ends of the walls 3 and 4 whereby the fish, heading into the stream, will be coralled into the passage at 10 and pass over the elevation at 11. The bottom of the spill-way at 8 is below the level of water at the upper side of the dam so that a continuous supply of water is provided. At the upper side of the dam between the walls 3 and 7 a recess, indicated at 13, is provided, the bottom of which is below the water level at the upper side of the dam but such water is blocked from flowing over the dam, as shown in Fig. 1. It is into this recess or pocket in the dam that the fish are deposited after being conveyed from the foot of the dam to the top thereof. It is to be understood that in the application of the invention to new constructions of dams the walls 3, 4, 5, 6, and 7 can be made of concrete and the showing in the drawings, is of such an installation. Dams which are already built may have the walls 3 and 7, inclusive, or any suitable equivalent supporting structure added to the dam so as to provide the necessary supports for the conveyer, the spill-way for the continuous flow of water and receiving pocket for the fish when they are delivered at the upper side of the dam.

A plurality of cross shafts 14, 15 and 16 are mounted in suitable bearings 17 which are fixed to the upper sides of the supporting walls 3, 4 and 7. Sprocket wheels 18 are carried on said shafts adjacent each of the bearings around which two endless chains 19 are placed. The number of shafts and sprocket wheels may be varied in accordance with the size and height of the dam so long as there is provided a lower horizontal run for the chains above that part of the race 10 between the projection 11 and the foot of the dam, and an upwardly inclined run between the foot and the top of the dam.

A water wheel 20 is mounted on a shaft 21 which is carried in suitable bearings, similar to the bearings 17, at the lower portions of the walls 6 and 7 so that the water flowing down the spillway at 8 drives said wheel. A sprocket wheel 22 on the shaft 21 drives an endless chain 23 which passes around a second sprocket wheel 24 associated with which is gearing 25 to drive the upper shaft 16 previously described, thereby driving the chains 19 continuously in the direction indicated by the arrows in Fig. 1.

It is not necessary for the driving of the endless conveyer chains 19 that they be driven by a water wheel. The shaft 16 may be equally well driven by an electric motor or any other suitable source of power. However, in many cases the water wheel will be the simplest and most economical way in which to drive the chains inasmuch as there is a continuous flow of water to drive the wheel as fully illustrated in the drawings.

A fish bucket is carried by and between the conveyer chains. In a preferred form of structure it is of a rectangular parallelepiped shape and is made up of a plurality of open frame members 26 with sides, top and bottom covered by a wire screen or other equivalent foraminous material 27. One end indicated at 28 in Fig. 8, is open at all times. The other end carries a hinged closure which is an open frame 29 with a screen 30 carried on the frame so that said other end of the receptacle or bucket may be closed at times and open at other times. The hinging of the closure 29 at 31 is such that when the bucket is carried into the race 10 the hinges are at the upper side of the bucket and the cover automatically moves to closed position by gravity.

The cover is releasably held in closed position. A keeper 32 (Fig. 8) is attached at the end of the bucket and a rod 33, spring actuated by spring 34, is mounted on the closure 29 so as to be engaged with the keeper and hold the closure in closed position as shown in Fig. 8. A cable 35 is connected to the upper end of rod 34 and is carried over the bucket and lengthwise thereof to adjacent the open end 28, and is connected to one end of a crank 36 mounted for rocking movements on the bucket. Said crank has a free end portion 37 which, in one position of movement of the bucket, as will later be described, engages against a trip to operate the same and withdraw the rod 33 from engagement with the keeper 32.

The bucket is carried by rods 38 and 39 which extend horizontally between the conveyer chains 19. One rod 38 passes through ears extending from the conveyer bucket at the open end 28 thereof. The other rod 39 passes underneath two curved shoes 40 which are attached to frame members of the conveyer bucket at opposite sides thereof.

The trip member previously mentioned is shown at 41 (Figs. 1 and 3) and consists of a rigid member secured at one end to a side of the wall 7 and being shaped so that its other end will interpose in the path of movement of the arm 37 of the crank to operate the latching bolt 33. The closure 29 for the bucket is held from swinging through a distance greater than a right angle substantially by stop fingers 42 (Fig. 7) secured at the hinged edge of the closure and which engage against the bucket and hold the closure to a limited swinging movement.

Referring to Fig. 1 and with the conveyer chains moving in the direction indicated by the arrows and continuously moving by reason of the driving thereof by the water wheel 20, the open end of the bucket is dipped into the water of the race at 10, and any fish which are in the water between the foot of the dam and the open end of the bucket are scooped thereinto. The closure at 29 is latched in closed position and the fish are carried by the bucket up the inclined face of the dam. When the position shown in Fig. 2 is reached by the bucket the arm 37 engages against the trip at 41 withdrawing the latching bolt 33. In such position the withdrawal of the latching bolt frees the closure at 29 to turn outwardly at right angles by gravity whereby the fish which have been carried upwardly in the bucket are dumped into the water in the pocket 13 of the dam as shown in Fig. 2. With a continuation of movement of the conveyer chains the bucket is carried at the upper sides of the upper runs of said chains. The latch bolt has been released as soon as the arm 37 passes from the trip 41. When the conveyer bucket passes around the sprocket wheels on the lowermost shaft 14, the change of position of the bucket causes the closure 29 to move to closed position by gravity and the latch bolt 33 rides over the inclined nose of the keeper 32 and automatically engages therewith holding the closure 29 against movement until it is again released when the bucket again reaches the position shown in Fig. 2. The bucket, as shown in Fig. 6, is designed to substantially fill the cross sectional area of the race at 10 whereby all of the fish ahead of the bucket are scooped thereinto.

The apparatus described is relatively simple but is very practical and effective. There may be used in connection with the conveyer apparatus described a screen, such as indicated at 43, located so that the descending bucket when it passes downwardly with the upper run of the chains 19 will not throw a shadow upon the water in the race at 10 and cause the fish to be frightened and swim back out of said race. During the seasons that the fish are not running the apparatus need not be operated and a suitable gate across the spill-way at 8 may be used to stop the flow of water passing through the spill-way. The invention is defined in the appended claims and is to be considered comprehensive of all forms of structure coming within the scope thereof.

I claim:

1. In a dam having a race for water extending down its inclined down-stream side and a distance in front of the foot of the dam, said race carrying water in a continuous stream from above to below the dam, the combination of an endless conveyer mounted on said dam and over said race, a bucket carried by the conveyer having an open end and a hinged closure at the opposite end, said bucket being carried by the conveyer into said race with its open end first entering the race, and said bucket having foraminous sides for the passage of water, a latch for holding the closure closed, and stationary means for automatically tripping the latch when the bucket is carried to the top of the dam to release said closure for opening.

2. A construction containing the elements in combination defined in claim 1, combined with a horizontally disposed elevation located across said race at the lower end of said conveyer and a distance in front thereof, said elevation extending between the sides of the race, whereby a water pocket is provided between said elevation at the foot of the dam, the depth of which pocket is greater than the depth of water over said elevation.

3. In a dam having a water race for carrying water from above the dam down the face thereof and to the foot of and away from the dam, said race having substantially parallel spaced apart sides extending a distance downstream from the foot of the dam, the combination of endless conveying means mounted on the face of the dam and the sides of said race, means for continuously driving said conveyer, a fish collecting and carrying bucket connected with said conveying means, and movable through said race toward the dam and upwardly along the face of the dam and thence back to the lower forward portion of the face, said bucket having an open end to first enter the race, a hinged closure at its other end, a movable latch mounted on said closure, a keeper for said latch connected to a fixed portion of the bucket, a latch operating means mounted on the bucket, means connecting said latch operating means with said movable latch, and a fixed trip located adjacent the top of the dam in the path of the latch operating means to automatically release the latch when moved by the conveyer to said trip to thereby permit the closure to move to an open position.

4. A construction containing the elements in combination defined in claim 3, combined with means for limiting the extent of opening of said hinged closure, whereby when the bucket is returned to the lower end of the conveying means, the closure automatically moves by gravity to closed position and the latch engages with said keeper.

5. In a dam interposed across a flowing stream of water, of a spill-way at the upper part of said dam for passage of water down the face of the dam, a race having substantially parallel spaced apart sides on the face of the dam and extending in front of the foot thereof for a distance through which the water passing said spill-way flows, the combination of an endless conveyer mounted over said race having spaced apart endless conveying chains, means for driving the same simultaneously, a bucket located between said chains at the outer sides thereof, said bucket having an open end, a rod extending between said chains adjacent the open end of the bucket to which said bucket is connected, a second rod extending between said chains a short distance from the opposite end of the bucket, curved shoes connected at their ends to said bucket at its opposite sides and between which and the bucket said second rod passes, a hinged closure at said opposite end of the bucket, releasable latching means for holding the closure in closed position, and stationary means for automatically operating the latching means to release the closure when the conveyer carries the bucket to a predetermined position at the top of the dam.

6. A construction containing the elements in combination defined in claim 5, said spill-way being located at one side of said conveyer and being connected with said race at a side thereof, a water wheel mounted on the dam at the lower part of the spill-way to be driven by the water passing over the dam, and means connecting the water wheel with the conveyer to continuously drive the same.

7. In combination with a dam located across a flowing stream of water, of a race having parallel spaced sides extending from a point in front of the dam to the foot thereof and upwardly on the down-stream face of said dam, said race having a lateral branch at one side extending from a point closely adjacent the top of the dam to the top of the dam, a spill-way at the top of the dam having its bottom below the level of water at the upper side of the dam and joining with said race whereby a continuous flow of water may pass through said spill-way and race, a water wheel mounted on the dam adjacent the lateral branch to be driven by said water, an endless conveyer mounted on and over said race having its upper portion located at one side of the water wheel, means to drive the conveyer by said water wheel, and means carried by said conveyer for receiving and collecting fish in the race at the lower side of the dam and carrying them to the top of the dam and delivering them to the up-stream side thereof.

FAYE WARNER.